United States Patent
Dzialas et al.

(10) Patent No.: US 7,735,712 B2
(45) Date of Patent: Jun. 15, 2010

(54) APPARATUS AND METHOD FOR ROTARY FRICTION WELDING

(75) Inventors: Karsten Dzialas, Munich (DE); Thomas Sparks, Kranzberg (DE)

(73) Assignee: MTU Aero Engines GmbH, Munich (DE)

( * ) Notice: Subject to any disclaimer, the term of this patent is extended or adjusted under 35 U.S.C. 154(b) by 473 days.

(21) Appl. No.: 10/592,031

(22) PCT Filed: Mar. 4, 2005

(86) PCT No.: PCT/DE2005/000364

§ 371 (c)(1),
(2), (4) Date: Jul. 23, 2007

(87) PCT Pub. No.: WO2005/087424

PCT Pub. Date: Sep. 22, 2005

(65) Prior Publication Data

US 2007/0272728 A1    Nov. 29, 2007

(30) Foreign Application Priority Data

Mar. 10, 2004    (DE) .................. 10 2004 011 615

(51) Int. Cl.
*B23K 20/12* (2006.01)

(52) U.S. Cl. .............. 228/112.1; 228/113; 228/2.1; 228/2.3

(58) Field of Classification Search .............. 228/112.1, 228/113, 2.1, 2.3
See application file for complete search history.

(56) References Cited

U.S. PATENT DOCUMENTS

| 3,235,157 | A | 2/1966 | Hollander |
| 3,694,896 | A | 10/1972 | Loyd |
| 3,735,910 | A | 5/1973 | Watson et al. |
| 4,030,658 | A | 6/1977 | Parrish |

FOREIGN PATENT DOCUMENTS

GB    1053233    12/1966

*Primary Examiner*—Jessica L. Ward
*Assistant Examiner*—Erin B Saad
(74) *Attorney, Agent, or Firm*—Crowell & Moring LLP

(57) ABSTRACT

A rotary friction welding machine and method is disclosed. The rotary friction welding machine has a first rotating spindle and a second non-rotating spindle, where a first component of the components being connected to one another is positioned on the first spindle and a second component of the components being connected to one another is positioned on the second spindle. Several flywheel mass bodies are positioned on the rotary friction welding machine, where the flywheel mass bodies cooperate with the first rotating spindle such that at least one of these flywheel mass bodies can be brought out of operating engagement or into operating engagement with the first rotating spindle, where both the flywheel mass bodies that are in operating engagement with the first rotating spindle and the flywheel mass bodies that are out of operating engagement with the first rotating spindle are positioned on the rotary friction welding machine.

5 Claims, 5 Drawing Sheets

APPARATUS AND METHOD FOR ROTARY FRICTION WELDING

BACKGROUND AND SUMMARY OF THE INVENTION

This application claims the priority of International Application No. PCT/DE2005/000364, filed Mar. 4, 2005, and German Patent Document No. 10 2004 011 615.6, filed Mar. 10, 2004, the disclosures of which are expressly incorporated by reference herein.

The invention relates to a rotary friction welding machine.

Friction welding is a widespread joining method for the fabrication of gas turbines. Friction welding is considered a part of the so-called pressure welding process, whereby in terms of friction welding a differentiation is made, among other things, between so-called linear friction welding, rotary friction welding and so-called friction stir welding. The present invention relates to so-called rotary friction welding in which rotationally symmetrical components are joined to one another or connected to one another via friction. In rotary friction welding, a first component rotates, while the other component is stationary and is pressed with a specific force against the rotating component. In this case, the joining surfaces of the components being connected to one another adapt to one another via hot forging.

Rotary friction welding is performed on so-called rotary friction welding machines, whereby, according to the prior art, the rotating component is positioned on a rotating spindle and the stationary component is positioned on a non-rotating spindle. According to the prior art, a disk flywheel or a flywheel mass body is allocated to the rotating spindle. The flywheel mass body and the rotational speed of the rotating spindle are coordinated with the components being connected to one another, particularly with the materials of the components being connected to one another. In the case of components that are made of nickel-based alloys, large or heavy flywheel masses and low rotational speeds of the rotating spindle are used. In this case, the following interrelationship applies: large or heavy flywheel masses are coupled with a low rotational speed of the rotating spindle and small or light flywheel masses are coupled with a great rotational speed of the rotating spindle.

In rotary friction welding machines known from the prior art, when there is a change in the components being connected to one another, particularly a change in the material composition of the components being connected to one another, it is necessary to adapt the rotary friction welding machine by exchanging or adapting the flywheel mass body or the disk flywheel to the modified conditions. In this case, it is necessary to perform expensive set-up work on the rotary friction welding machine according to the prior art. Thus, according to the prior art, the flywheel mass bodies are positioned or removed using a crane. This type of set-up work requires a lot of time and causes downtime for the rotary friction welding machine.

Starting from this, the object of the present invention is to create a novel rotary friction welding machine.

According to the invention, several flywheel mass bodies are positioned on the rotary friction welding machine, wherein the flywheel mass bodies cooperate with the first rotating spindle such that at least one of these flywheel mass bodies can, as needed, be brought out of operating engagement or into operating engagement with the first rotating spindle, wherein both the flywheel mass bodies that are in operating engagement with the first rotating spindle and the flywheel mass bodies that are out of operating engagement with the first rotating spindle are positioned on the rotary friction welding machine. In so doing, the rotating spindle itself can serve as a flywheel mass body. According to the present invention, it is possible to adapt the rotary friction welding machine to changing components without expensive retooling or set-up work.

According to an advantageous development of the invention, several flywheel mass bodies are allocated to the first rotating spindle such that the flywheel mass bodies when in operating engagement with the first spindle rotate jointly with the spindle and when out of operating engagement with the first spindle are stationary as compared with the spindle. In this connection, at least one of the flywheel mass bodies is rigidly connected to the first rotating spindle, while the or every other flywheel mass body is rotatably mounted on the spindle in such a way that the or every flywheel mass body that is rotatably mounted on the first spindle can be selectively coupled to and uncoupled from the or every flywheel mass body that is rigidly connected to the first spindle. This embodiment of the rotary friction welding machine has a particularly simple structure.

According to an alternative advantageous development of the invention, the several flywheel mass bodies are allocated to a flywheel mass shaft, wherein the flywheel mass shaft is coupled to the first rotating spindle via a transmission gear. The first spindle that bears the rotating component can be coupled via the transmission gear to a flywheel mass shaft that rotates more quickly. In this case, smaller flywheel masses that rotate at a greater rotational speed can be used in order to generate the same torque.

According to another alternative advantageous development of the invention, the flywheel mass bodies can be moved back and forth between two magazine halves such that the flywheel mass bodies are in operating engagement with the first spindle in a position that is inserted into a first magazine half and out of operating engagement with the first spindle in a position that is inserted into a second magazine half. Both magazine halves are preferably embodied as a revolver magazine, wherein the two magazine halves have recesses to accommodate the flywheel mass bodies.

BRIEF DESCRIPTION OF THE DRAWINGS

Preferred developments of the invention are yielded from the following description. Without being limited hereto, exemplary embodiments of the invention are explained in greater detail on the basis of the drawings.

DETAILED DESCRIPTION OF THE DRAWINGS

Figure 1:
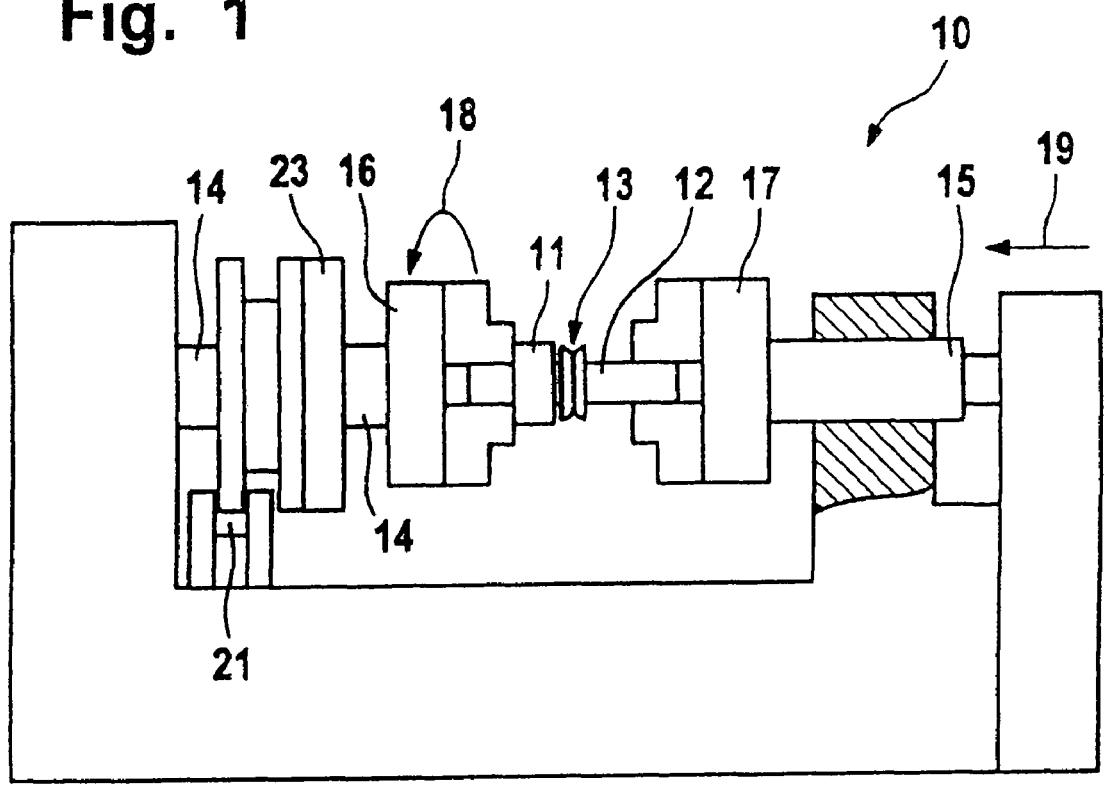
FIG. 1 is a schematic depiction of a rotary friction welding machine according to the prior art.
Figure 2:
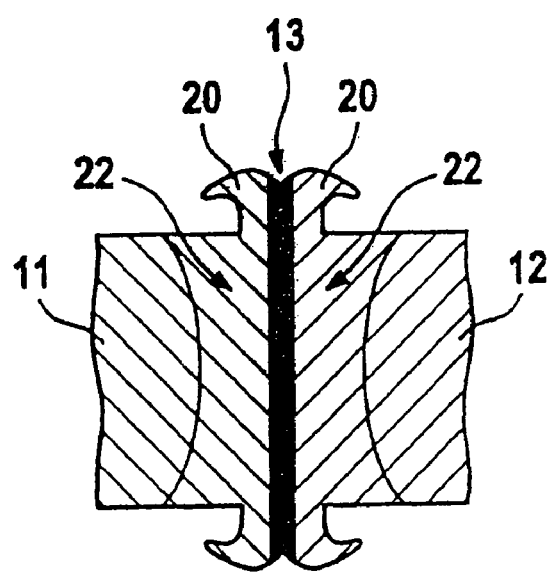
FIG. 2 illustrates a rotary friction welding seam between two components that are connected to one another.

FIG. 1 shows a rotary friction welding machine 10 for joining two components 11 and 12 according to the prior art, wherein the connecting seam 13 depicted in an enlarged manner in FIG. 2 is embodied between the components 11 and 12 during rotary friction welding. The rotary friction welding machine 10 in accordance with the prior art that is depicted in FIG. 1 has a first rotating spindle 14 and a second non-rotating spindle 15. Arranged or positioned on the first rotating spindle 14 is the component 11 and on the second non-rotating spindle is the component 12 of the components 11 and 12 being connecting to one another. For this purpose, tensioning devices 16 and 17 are allocated to each of the spindles 14 and 15. The components 11 and 12 being connected to one another can be fastened to the respective spindle 14 or 15 using the tensioning devices 16 and 17.

In order to connect the two components 11 and 12 to one another using rotary friction welding, the component 11 positioned on the first rotating spindle 14 is rotated in the direction of arrow 18, wherein the component 12 positioned on the second non-rotating spindle 15 is pressed against the component 11 in the direction of arrow 19 with a force. The relative rotation between the components 11 and 12 and this force generate friction and therefore heat the two components 11 and 12 on contact surfaces 21, 22 of the components. In so doing, a hot forging of the material of components 11 and 12 takes place on the contact surfaces and the connection bead 20 depicted schematically in FIG. 2 forms in the process.

In FIG. 1, a flywheel mass body 23 is allocated to the rotary friction welding machine 10 according to the prior art, namely in the area of the first rotating spindle 14. According to the prior art, this flywheel mass body 23 of the rotary friction welding machine 10 is adapted to the components 11 and 12 being connected to one another. If, after welding two components, different components are supposed to be welded to one another, then, according to the prior art, the flywheel mass body 23 has to be exchanged in the course of expensive set-up measures on the rotary friction welding machine 10. This is very time consuming.

Figure 3:
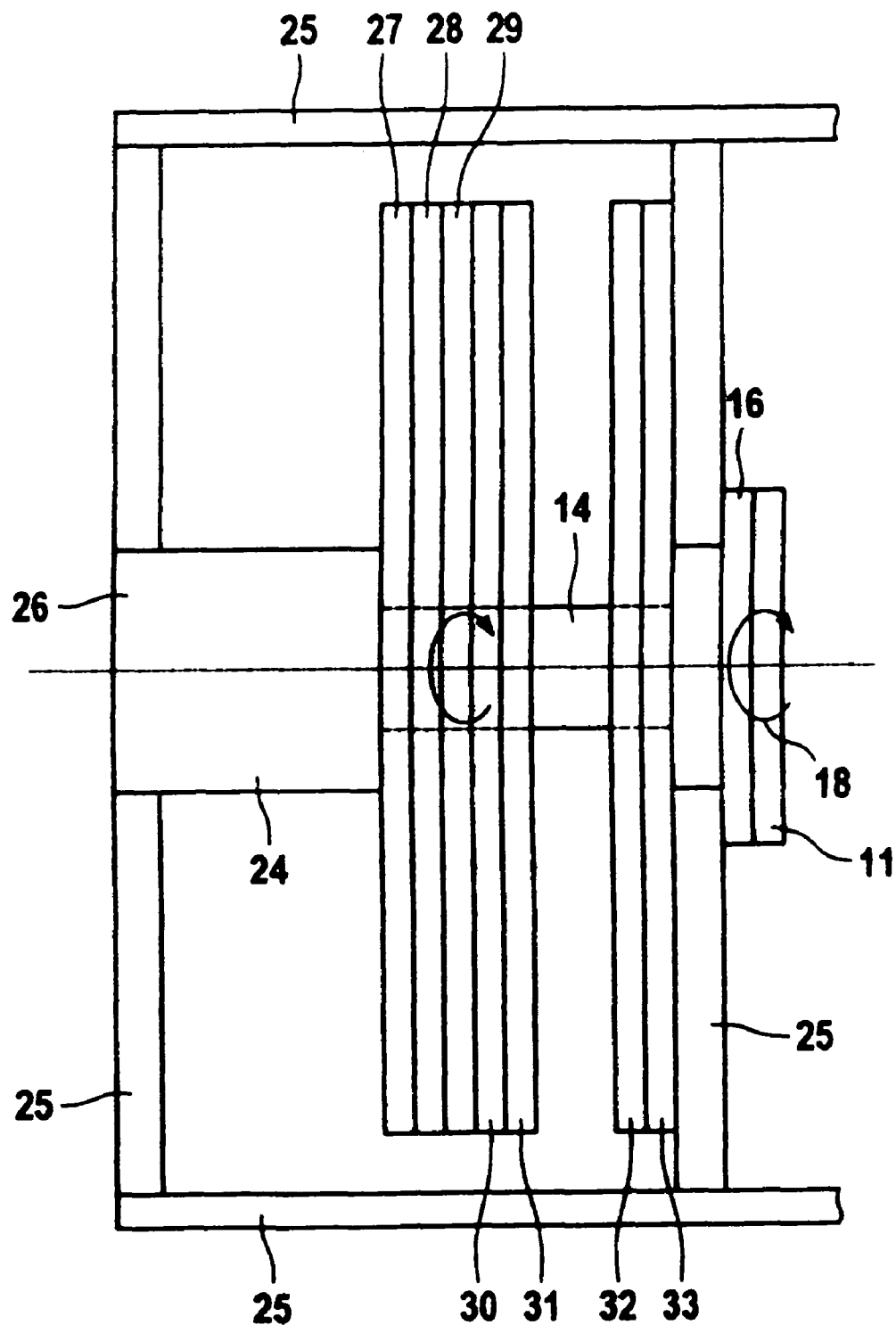
FIG. 3 is a schematic detail of a rotary friction welding machine in accordance with the invention according to a first exemplary embodiment of the invention.

FIG. 3 shows a section of a rotary friction welding machine according to the invention in accordance with a first exemplary embodiment of the present invention in the area of the rotating first spindle 14 and a tensioning device 16 that is allocated to the spindle 14 for receiving the component 11 rotating with the spindle 14 and the tensioning device 16. FIG. 3 also shows a rotor 24 for driving the spindle 14 and a machine frame 25, wherein the motor 24 is positioned on the machine frame 25 via a thrust bearing 26.

According to the present invention, several flywheel mass bodies 27, 28, 29, 30, 31, 32, and 33 are allocated to the first rotating spindle 14. To adapt the rotary friction welding machine to the components being connected to one another, the flywheel mass bodies 27 through 33 can, as needed, be brought out of operating engagement or into operating engagement with the first rotating spindle 14. In the exemplary embodiment shown in FIG. 3, flywheel mass bodies 27 through 31 rotate jointly with spindle 14, while flywheel mass bodies 32 and 33 are stationary as compared with spindle 14. In the exemplary embodiment in FIG. 3, the flywheel mass bodies 27 through 33 are accordingly allocated to spindle 14 and positioned on the spindle. The flywheel mass bodies 27 through 33 are coupled or accordingly uncoupled as needed in the exemplary embodiment in FIG. 3. Both the flywheel mass bodies that are in operating engagement with the first rotating spindle 14 and the flywheel mass bodies that are out of operating engagement with the first rotating spindle are positioned on the rotary friction welding machine. Set-up times on the rotary friction welding machine can be reduced significantly as a result. It must be noted that all flywheel mass bodies 27 through 33 can be brought out of operating engagement with the first rotating spindle 14 so that in this case the mass of the first rotating spindle 14 represents the only effective flywheel mass.

Figure 4:
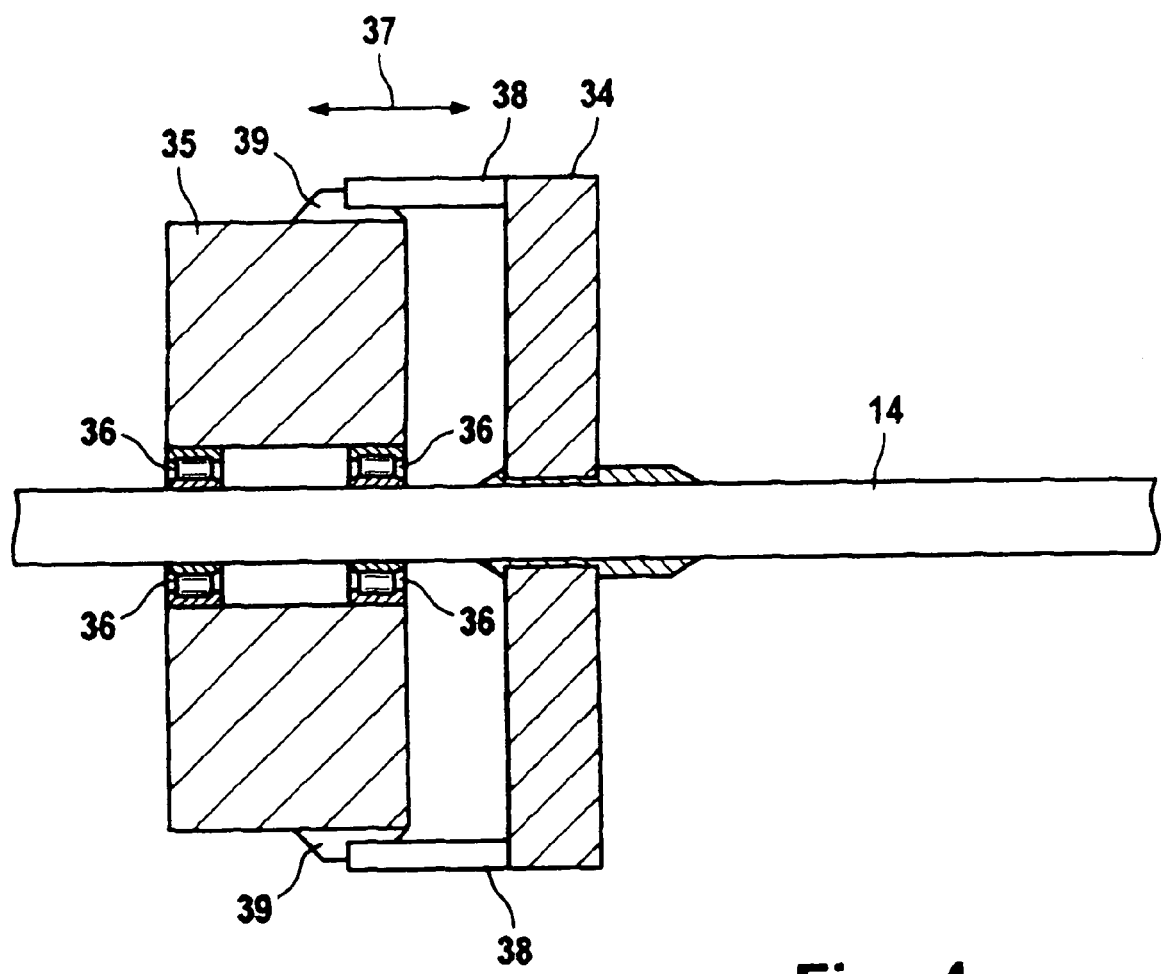
FIG. 4 is a schematic detail of a rotary friction welding machine in accordance with the invention according to a second exemplary embodiment of the invention.

FIG. 4 shows a preferred development of the exemplary embodiment in FIG. 3. Also in the case of the exemplary embodiments in FIG. 4, flywheel mass bodies 34 and 35 are positioned on the first rotating spindle 14. The first flywheel mass body 34 is connected to the spindle 14 in such a way that the flywheel mass body always rotates with the spindle 14. The second flywheel mass body 35, however, is rotatably mounted on the spindle 14 via pivot bearings 36. As FIG. 4 shows, the two flywheel mass bodies 34 and 35 can be displaced by sliding relative to one another in the direction of double arrow 37 in the axial direction of the spindle 14 in such a way that the second flywheel mass body 35 can be coupled to the first flywheel mass body 34 or can be uncoupled from the first flywheel mass body. In the position depicted in FIG. 4, the first flywheel mass body 34 engages with claw-like elements 38 in corresponding projections or recesses 39 of the second flywheel mass body 35. Consequently, in FIG. 4 the second flywheel mass body 35 is coupled to the first flywheel mass body 34. In this state, both flywheel mass bodies 34 and 35 rotate jointly with the spindle 14. By moving the two flywheel mass bodies 34 and 35 apart in the direction of double arrow 37, the claw-like elements 38 can be disengaged from the projections or recesses 39. In this case, the second flywheel mass body 35 is then uncoupled from the first flywheel mass body 34, and only the flywheel mass body 34 rotates jointly with the spindle 14. In this case, the second flywheel mass body 35 is stationary as compared with the rotating spindle 14 due to the inertia of mass of the second flywheel mass body. The coupling or uncoupling of the two flywheel mass bodies 34 and 35 described in connection with FIG. 4 can be accomplished mechanically, electrically or hydraulically. It must be noted that several flywheel mass bodies 35 can be brought into operating engagement or out of operating engagement with the flywheel mass body 34 in this manner. The mass of the rotating spindle 14 also acts a flywheel mass. Both the flywheel mass bodies in operating engagement with the first rotating spindle 14 as well as the flywheel mass bodies out of operating engagement with the spindle are positioned on the rotary friction welding machine.

Figure 5:
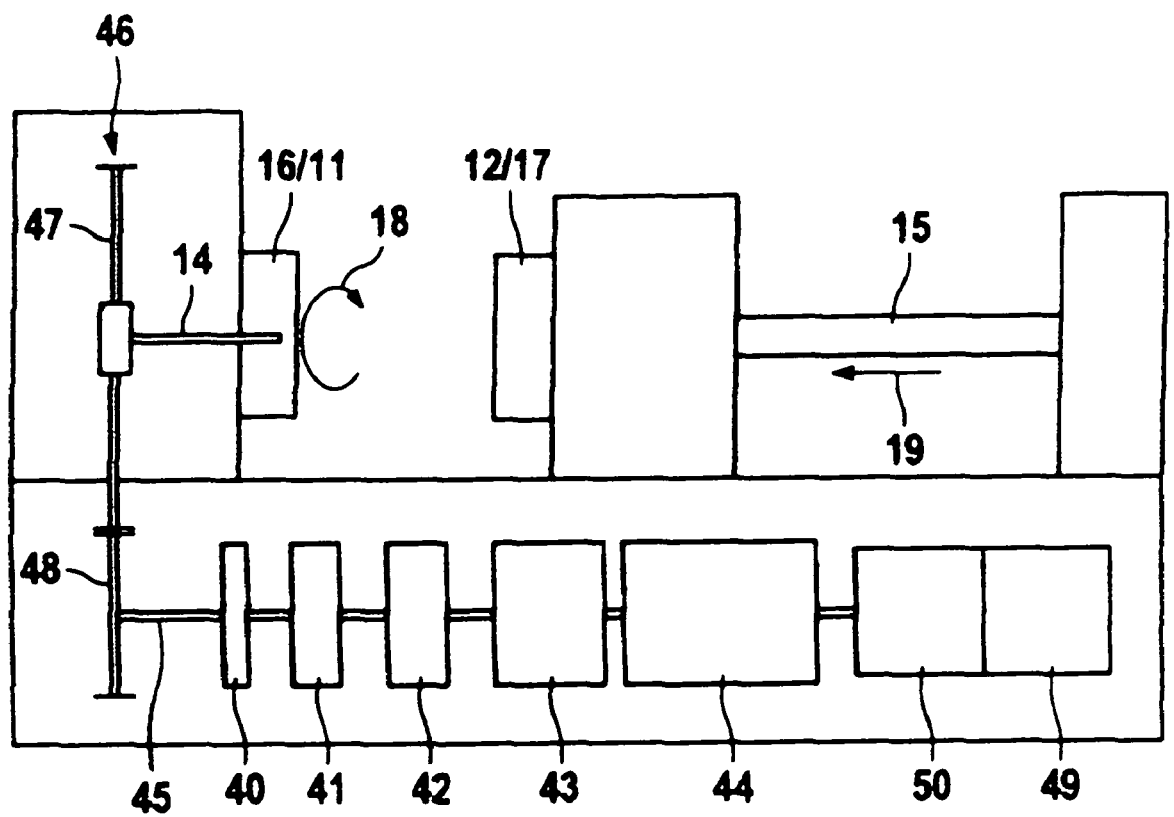
FIG. 5 is a schematic depiction of a rotary friction welding machine according to another exemplary embodiment of the invention.

FIG. 5 shows another exemplary embodiment of the present invention of a rotary friction welding machine according to the invention. In the case of the rotary friction welding machine depicted in FIG. 5, several disk flywheel bodies or flywheel mass bodies 40, 41, 42, 43 and 44 again cooperate with the rotating spindle 14, wherein, in contrast to the exemplary embodiments described above, the flywheel mass bodies 40 through 44 are not directly allocated to the rotating spindle 14, but are arranged on a flywheel mass shaft 45. The flywheel mass bodies 40 through 44 arranged on the flywheel mass shaft 45 can again be brought selectively, i.e., depending on need, out of operating engagement or into operating engagement with the rotating spindle 14. Coupling or uncoupling a flywheel mass body to or from another or several other flywheel mass bodies on the flywheel mass shaft 45 can be accomplished analogously to the exemplary embodiment in FIG. 4.

In the exemplary embodiment in FIG. 5, the spindle 14 is coupled with the flywheel mass shaft 45 via a transmission gear 46. A first gearwheel 47 of the transmission gear 46 is allocated to the rotating spindle 14, a second gearwheel 48 is allocated to the flywheel mass shaft 45. As FIG. 5 shows, the gearwheel 48 allocated to the flywheel mass shaft 45 has a smaller radius or diameter than the gearwheel 47 allocated to the spindle 14. The spindle 14 can be coupled to more quickly rotating flywheel mass bodies 40 to 44 with the aid the transmission gear 46. Rotational speeds can be adjusted or modified accordingly via the transmission gear 46. In the exemplary embodiment in FIG. 5, it is possible to work with considerably smaller flywheel masses, which are driven on the flywheel mass shafts 45 at higher rotational speeds, in order to provide the spindle 14 with sufficient torque. FIG. 5 also shows an electric drive motor 49 for driving the flywheel mass shaft 45 as well as means 50, which are used for coupling or uncoupling the flywheel mass bodies 40 through 44 to the flywheel mass shaft 45. The means 50 can again be of a mechanical, electrical or hydraulic nature. In this exemplary embodiment as well, the mass of the spindle 14 can also be the only effective flywheel mass. Both the flywheel mass bodies in operating engagement with the first rotating spindle 14 as well as the flywheel mass bodies out of operating engagement with the spindle are positioned on the rotary friction welding machine.

Figure 6:
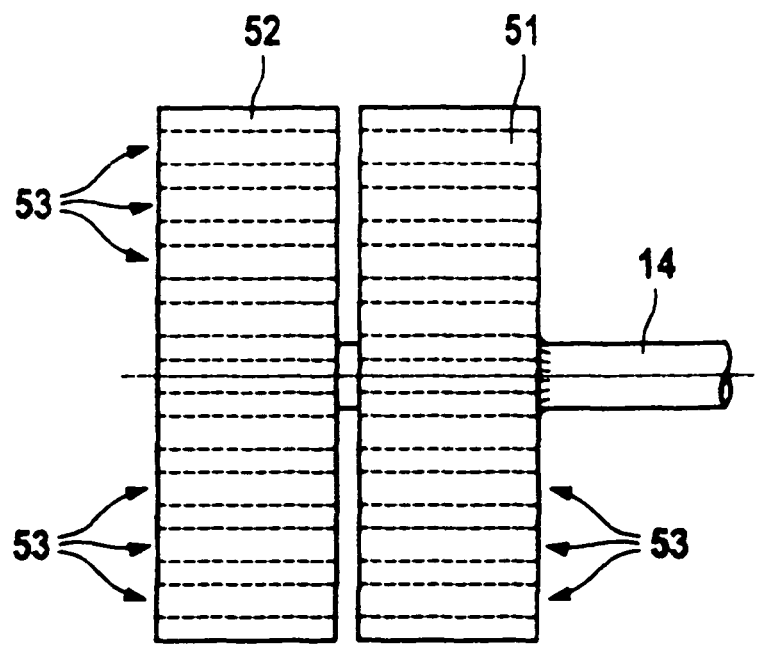
FIG. 6 is a schematic detail of a rotary friction welding machine in accordance with the invention according to another exemplary embodiment of the invention.
Figure 7:
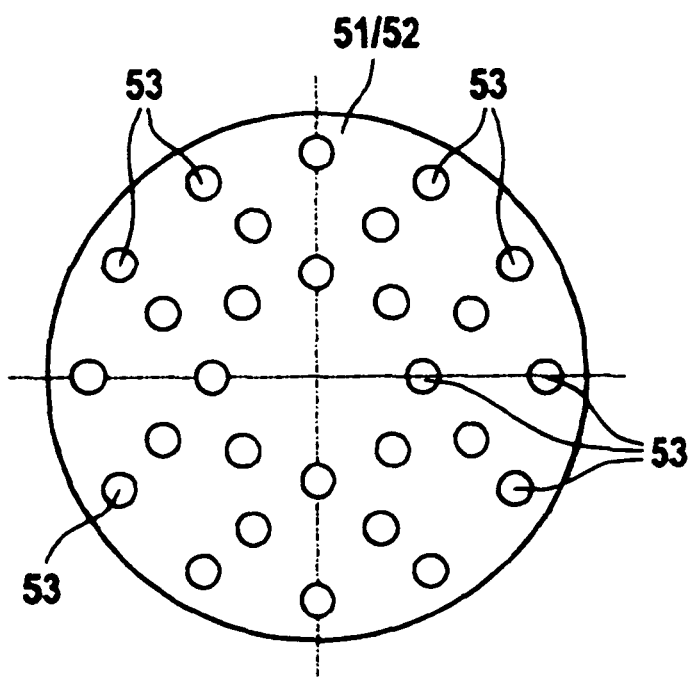
FIG. 7 is a view of the detail from FIG. 6 rotated by 90° as compared to FIG. 6.

FIGS. 6 and 7 show a detail of a rotary friction welding machine according to another exemplary embodiment of the present invention. In the case of the exemplary embodiments in FIGS. 6 and 7, a first magazine half 51 of a flywheel mass magazine is rigidly connected to the rotating spindle 14. The first magazine half 51 rotates accordingly with the spindle 14. In addition, the flywheel mass magazine in the exemplary embodiment in FIGS. 6 and 7 has a second magazine half 52. The second magazine half 52 is uncoupled from the spindle 14 and is stationary.

Recesses 53 have been introduced in both magazine halves 51 and 52. The recesses 53 that have been introduced in the two magazine halves 51 and 52 are aligned with one another. In the case where no relative movement takes place between the two magazine halves 51 and 52, a recess 53 in the area of the first magazine half 51 will be opposite from a corresponding recess 53 in the area of the second magazine half 52. The recesses 53 of the two magazine halves 51 and 52 are now embodied in such a manner that the recesses can accommodate flywheel mass bodies. In this connection, a flywheel mass body from a recess 53 in the area of the first magazine half 51 can be inserted into a corresponding recess 53 in the second magazine half 52 and can also be returned from the second magazine half 52 into the first magazine half 51. Consequently, simple displacement of the flywheel mass bodies sliding between the two magazine halves 51 and 52 makes it possible to adjust the flywheel mass rotating with the spindle 14 in a simple way. A flywheel mass magazine that has been designed in this way is also called a revolver magazine. The flywheel masses are embodied as rod-like elements having an outer contour that is adapted to the inner contour of the recesses. When loading flywheel mass bodies into the recesses 53 of the first magazine half 51, imbalances must be avoided by appropriately loading the flywheel mass bodies.

In all of the exemplary embodiments shown, it is possible to adapt a rotary friction welding machine without time-consuming retooling work with respect to flywheel masses required for connecting two components. Both the flywheel mass bodies in operating engagement with the first rotating spindle as well as the flywheel mass bodies out of operating engagement with the spindle are positioned on the rotary friction welding machine. Time-consuming set-up work that restricts the availability of the rotary friction welding machine can be avoided as a result.

The invention claimed is:

1. A rotary friction welding machine for joining or connecting components, comprising a first rotating spindle and a second non-rotating spindle and two magazines halves, wherein a first component of the components being connected to one another is positioned on the first spindle and a second component of the components being connected to one another is positioned on the second spindle, wherein several flywheel mass bodies are positioned on the rotary friction welding machine, wherein the flywheel mass bodies cooperate with the first rotating spindle such that at least one of the flywheel mass bodies can be brought out of operating engagement or into operating engagement with the first rotating spindle, wherein flywheel mass bodies that are in operating engagement with the first rotating spindle and flywheel mass bodies that are out of operating engagement with the first rotating spindle are positioned on the rotary friction welding machine, and wherein the flywheel mass bodies are moveable back and forth between the two magazine halves such that the flywheel mass bodies are in operating engagement with the first spindle in a position that is inserted into a first magazine half and out of operating engagement with the first spindle in a position that is inserted into a second magazine half.

2. The rotary friction welding machine according to claim 1, wherein the first magazine half is rigidly connected to the first spindle and the second magazine half is rotatable as compared with the first spindle.

3. The rotary friction welding machine according to claim 1, wherein the two magazine halves are embodied as a revolver magazine, wherein the two magazine halves have recesses to accommodate the flywheel mass bodies.

4. An apparatus for rotary friction welding, comprising:
   a rotary friction welding machine, including:
      a first rotatable spindle;
      a second non-rotatable spindle; and
      two magazine halves; and
      a plurality of flywheel mass bodies;
   wherein the plurality of flywheel mass bodies are positioned on the rotary friction welding machine, and wherein at least one of the plurality of flywheel mass bodies is operatively engageable and dis-engageable with the first rotatable spindle;
   and wherein the plurality of flywheel mass bodies are moveable between a first and a second magazine half, wherein when the at least one of the flywheel mass bodies is operatively engaged with the first rotatable spindle the at least one of the flywheel mass bodies is inserted into the first magazine half, and wherein when the at least one of the flywheel mass bodies is operatively dis-engaged with the first rotatable spindle the at least one of the flywheel mass bodies is inserted into the second magazine half.

5. The apparatus according to claim 4, wherein the first magazine half is rigidly connected to the first rotatable spindle and the second magazine half is rotatable with respect to the first rotatable spindle.

* * * * *